United States Patent
Ikoma et al.

(10) Patent No.: US 11,383,228 B2
(45) Date of Patent: Jul. 12, 2022

(54) CONDUCTIVE HONEYCOMB STRUCTURE

(71) Applicant: NGK INSULATORS, LTD., Nagoya (JP)

(72) Inventors: Ai Ikoma, Nagoya (JP); Yoshiyuki Kasai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 737 days.

(21) Appl. No.: 16/299,802

(22) Filed: Mar. 12, 2019

(65) Prior Publication Data
US 2019/0299202 A1 Oct. 3, 2019

(30) Foreign Application Priority Data
Mar. 29, 2018 (JP) .............................. JP2018-065700

(51) Int. Cl.
*F01N 3/20* (2006.01)
*B01J 35/04* (2006.01)
(Continued)

(52) U.S. Cl.
CPC ........... *B01J 35/04* (2013.01); *B01J 35/0033* (2013.01); *B01J 35/108* (2013.01);
(Continued)

(58) Field of Classification Search
CPC ..... B01J 35/04; B01J 35/0033; F01N 3/2842; F01N 3/2828; F01N 3/2026; F01N 2330/06; F01N 2330/30; H05B 2203/024
(Continued)

(56) References Cited

U.S. PATENT DOCUMENTS 5,063,029 A   11/1991   Mizuno et al.
5,465,573 A   11/1995   Abe et al.
(Continued)

FOREIGN PATENT DOCUMENTS

JP   H05-006120 U   1/1993
JP   H06-50135 A    2/1994
(Continued)

OTHER PUBLICATIONS

Japanese Office Action (Application No. 2018-065700) dated Sep. 14, 2021 (with English translation).
(Continued)

*Primary Examiner* — Tom P Duong
(74) *Attorney, Agent, or Firm* — Burr & Brown, PLLC

(57) ABSTRACT

A conductive honeycomb structure that is divided into four equal portions in a flow path direction of cells in the structure to form four regions of A, B, C, and D from a side closer to a first end face, and an average value of electric resistances measured between two points in each of the four regions is represented as $R_A$, $R_B$, $R_C$, and $R_D$ in this order from the side closer to the first end face. A relational expression of $R_A \leq R_B \leq R_C \leq R_D$ (excluding $R_A = R_B = R_C = R_D$) is satisfied provided that the two points being determined so that a distance between a pair of electrode layers arranged on an outer peripheral side wall of the structure is the longest in the cross section perpendicular to the flow path direction of the cells.

11 Claims, 7 Drawing Sheets

(51) Int. Cl.
  *B01J 35/00* (2006.01)
  *B01J 35/10* (2006.01)
  *H05B 3/14* (2006.01)
  *H05B 3/42* (2006.01)
  *F01N 3/28* (2006.01)

(52) U.S. Cl.
  CPC .......... *B01J 35/1076* (2013.01); *H05B 3/148* (2013.01); *H05B 3/42* (2013.01); *F01N 3/2842* (2013.01); *H05B 2203/024* (2013.01)

(58) Field of Classification Search
  USPC ....................................................... 422/174
  See application file for complete search history.

(56) References Cited

U.S. PATENT DOCUMENTS

| | | | |
|---|---|---|---|
| 2012/0003420 A1* | 1/2012 | Betsushiyo | C04B 35/573 428/116 |
| 2012/0076699 A1* | 3/2012 | Ishihara | B01J 19/2485 422/174 |
| 2012/0187109 A1 | 7/2012 | Noguchi et al. | |
| 2012/0241439 A1* | 9/2012 | Hashimoto | F01M 5/00 219/541 |
| 2013/0036719 A1* | 2/2013 | Noguchi | C04B 35/6263 55/523 |
| 2014/0291315 A1 | 10/2014 | Mase et al. | |
| 2015/0030510 A1* | 1/2015 | Mase | F01N 3/2026 422/180 |
| 2016/0243500 A1* | 8/2016 | Omiya | F01N 3/0222 |
| 2017/0260887 A1* | 9/2017 | Takase | F01N 3/2828 |
| 2017/0283931 A1* | 10/2017 | Matsui | H05B 3/12 |

FOREIGN PATENT DOCUMENTS

| | | |
|---|---|---|
| JP | 2931362 B2 | 8/1999 |
| JP | 2014-198296 A | 10/2014 |
| JP | 2016-193401 A | 11/2016 |
| WO | 2011/043434 A1 | 4/2011 |

OTHER PUBLICATIONS

Chinese Office Action, Chinese Application No. 201910195956.4 dated May 11, 2022 (7 pages).

* cited by examiner

[FIG. 1]
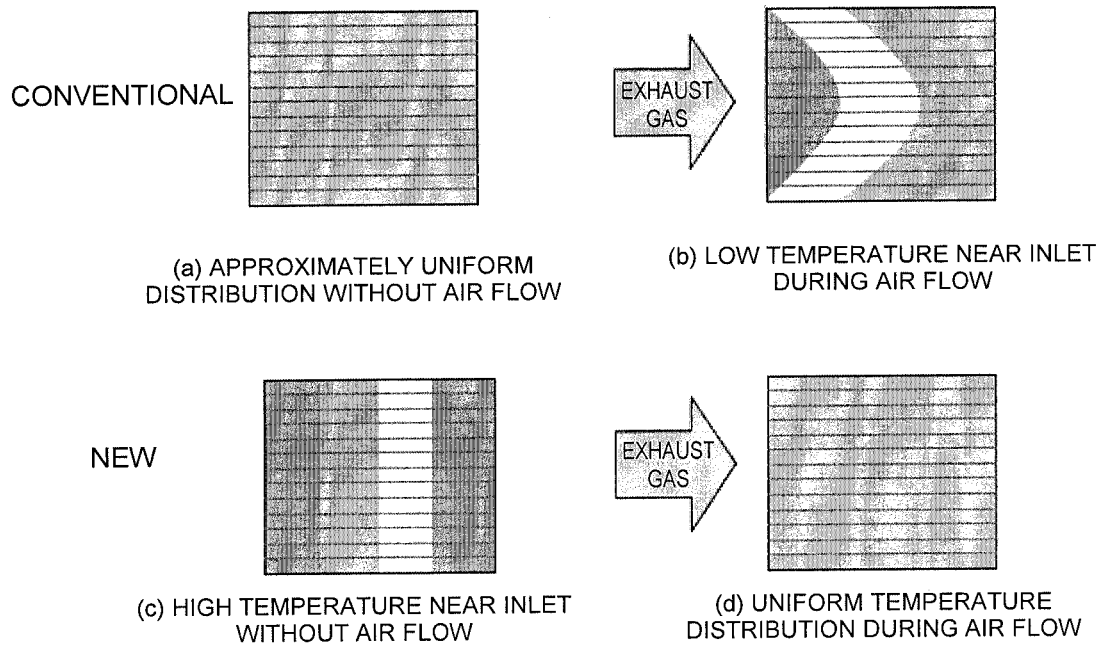
(a) APPROXIMATELY UNIFORM DISTRIBUTION WITHOUT AIR FLOW
(b) LOW TEMPERATURE NEAR INLET DURING AIR FLOW
(c) HIGH TEMPERATURE NEAR INLET WITHOUT AIR FLOW
(d) UNIFORM TEMPERATURE DISTRIBUTION DURING AIR FLOW
[FIG. 2-1]
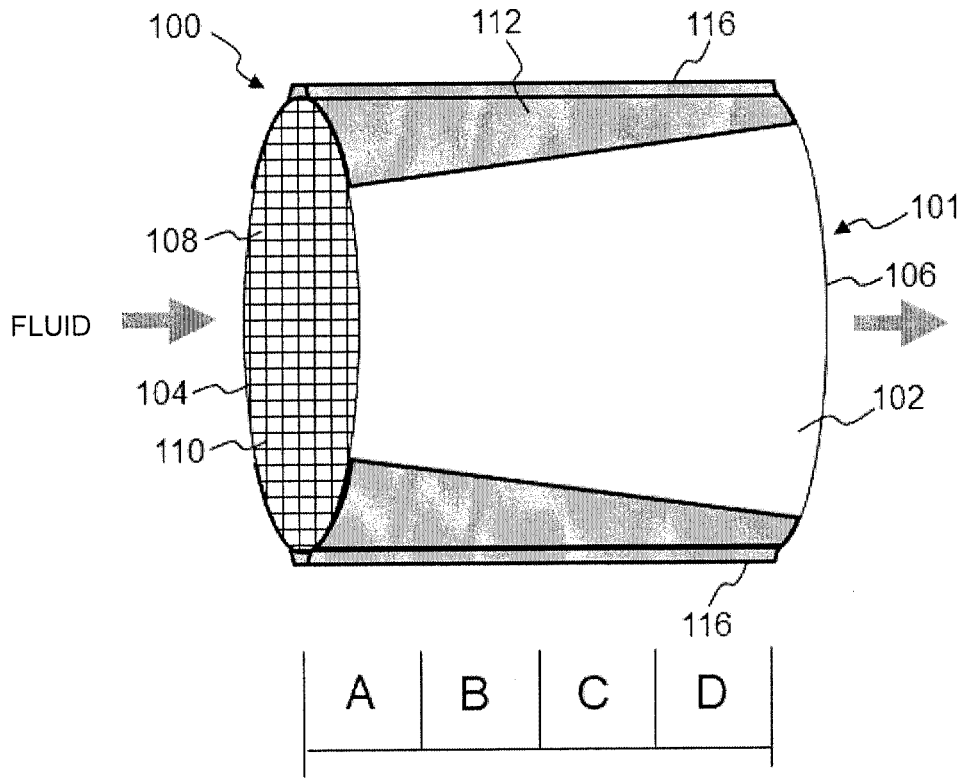

[FIG. 2-2]
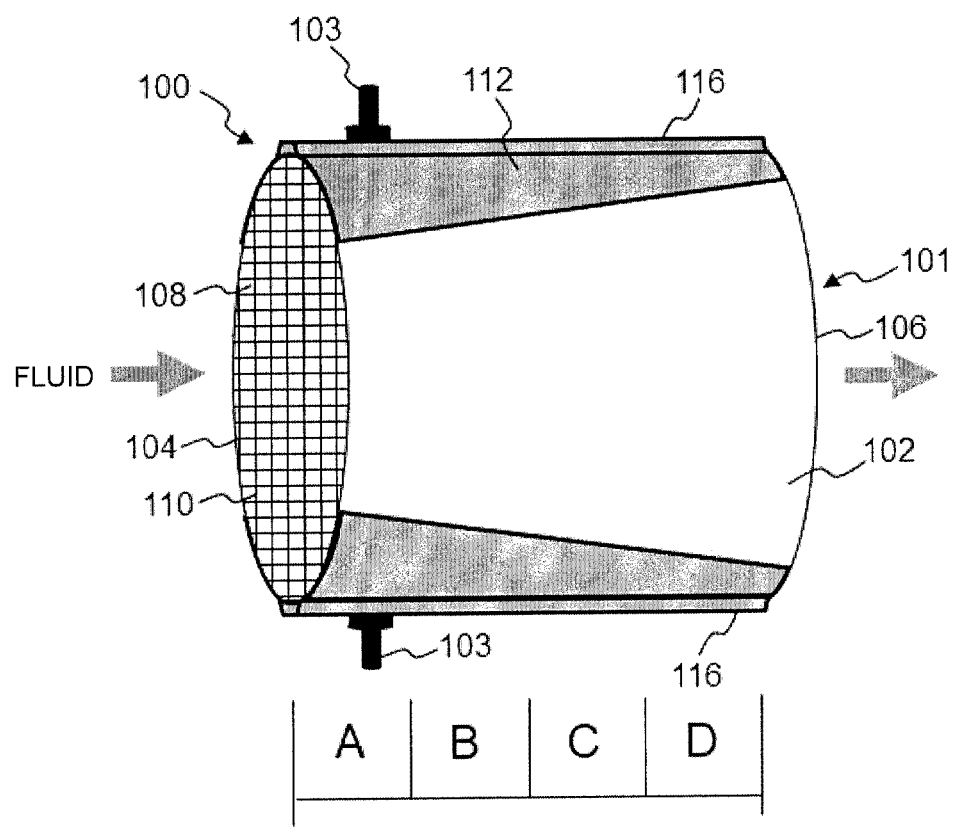

[FIG. 3]
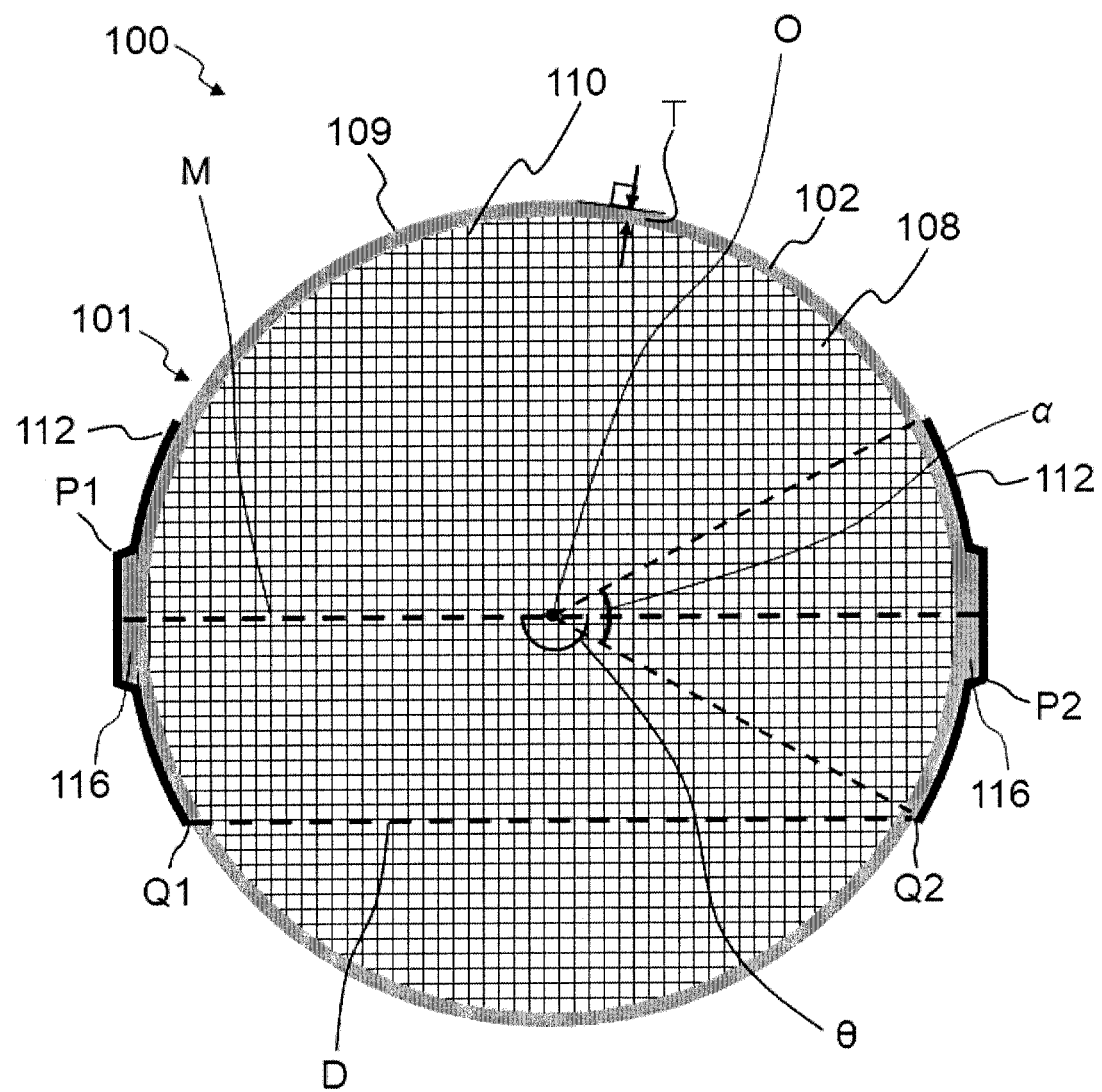

[FIG. 4]
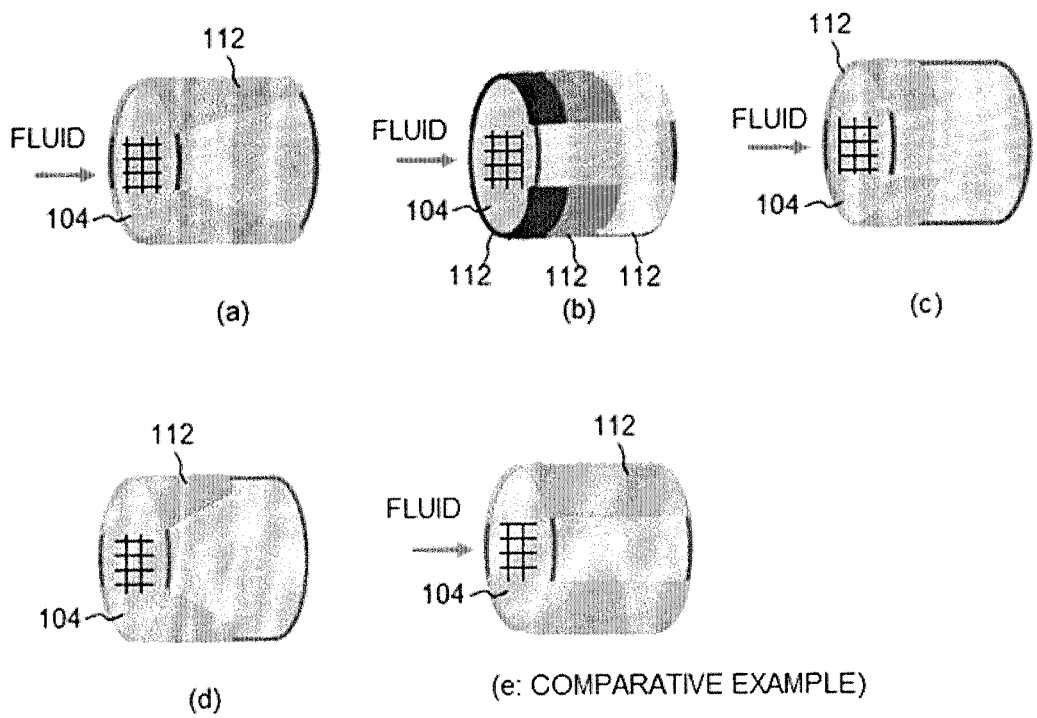
[FIG. 5]
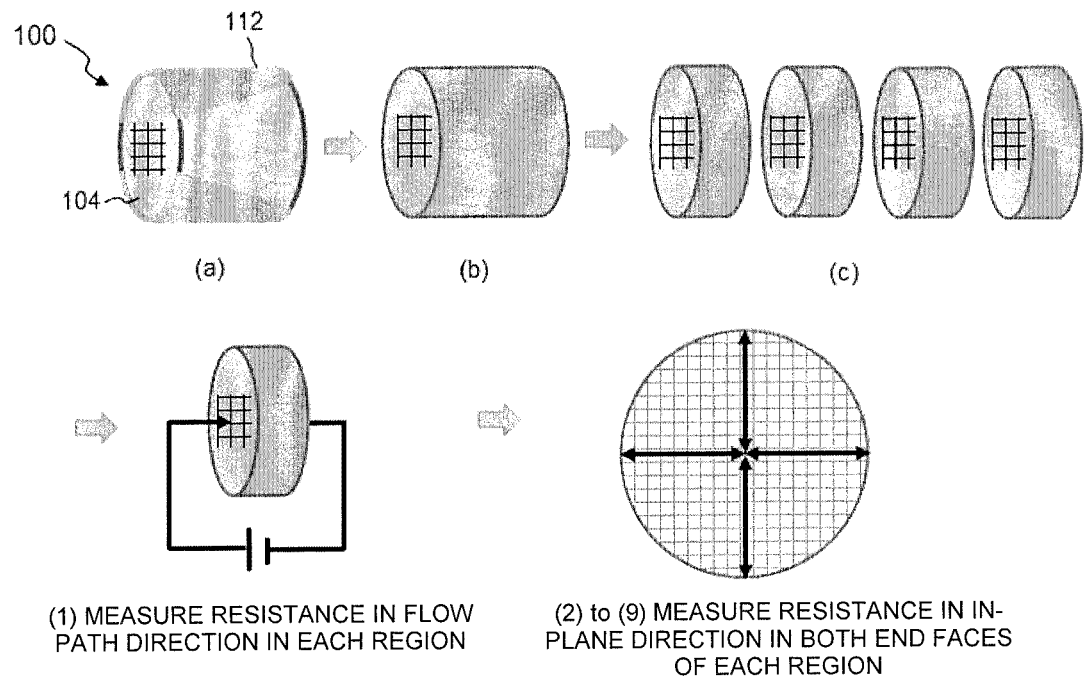

[FIG. 6]
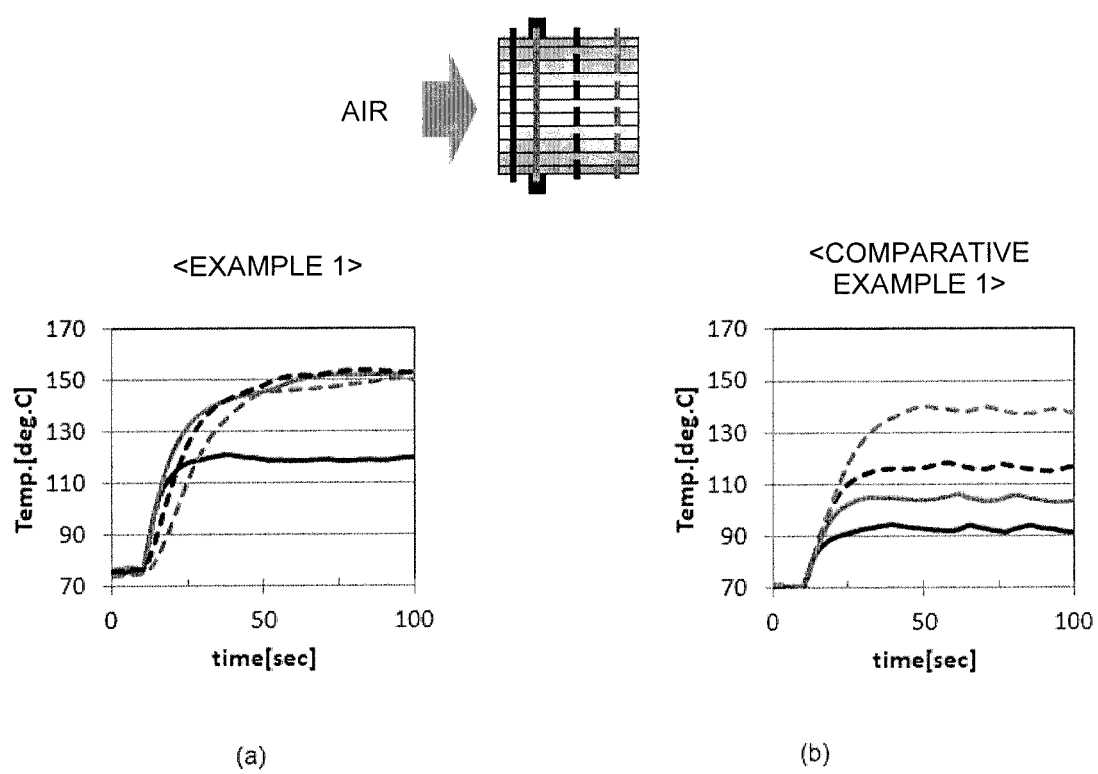
(a)  
(b)

[FIG. 7]
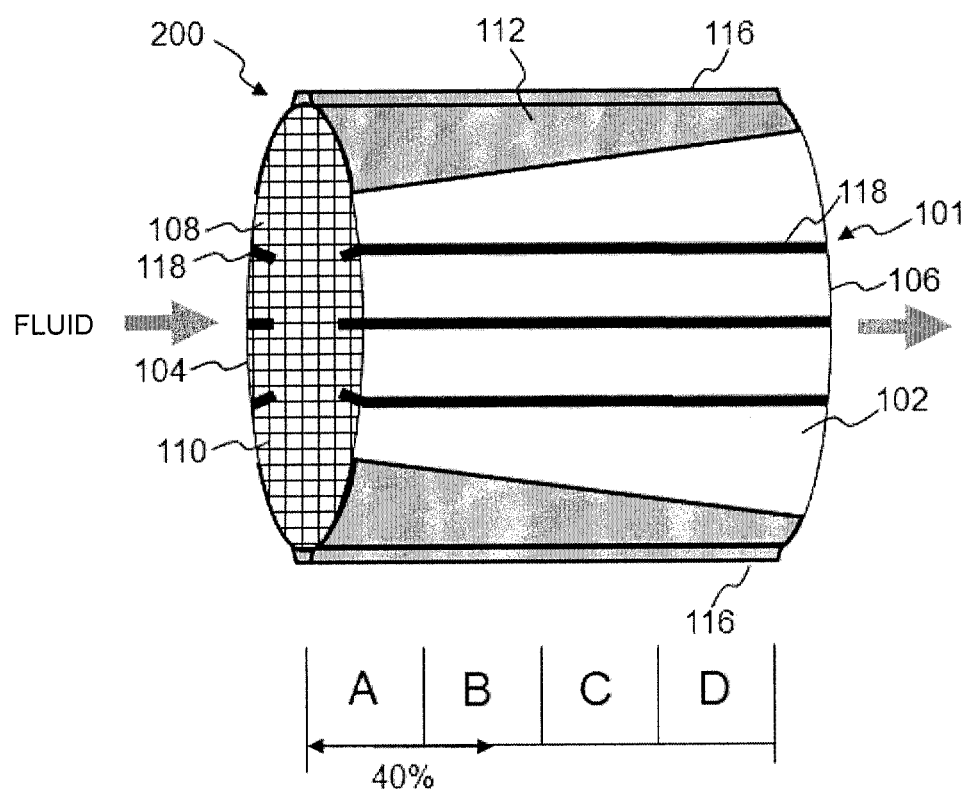

[FIG. 8]
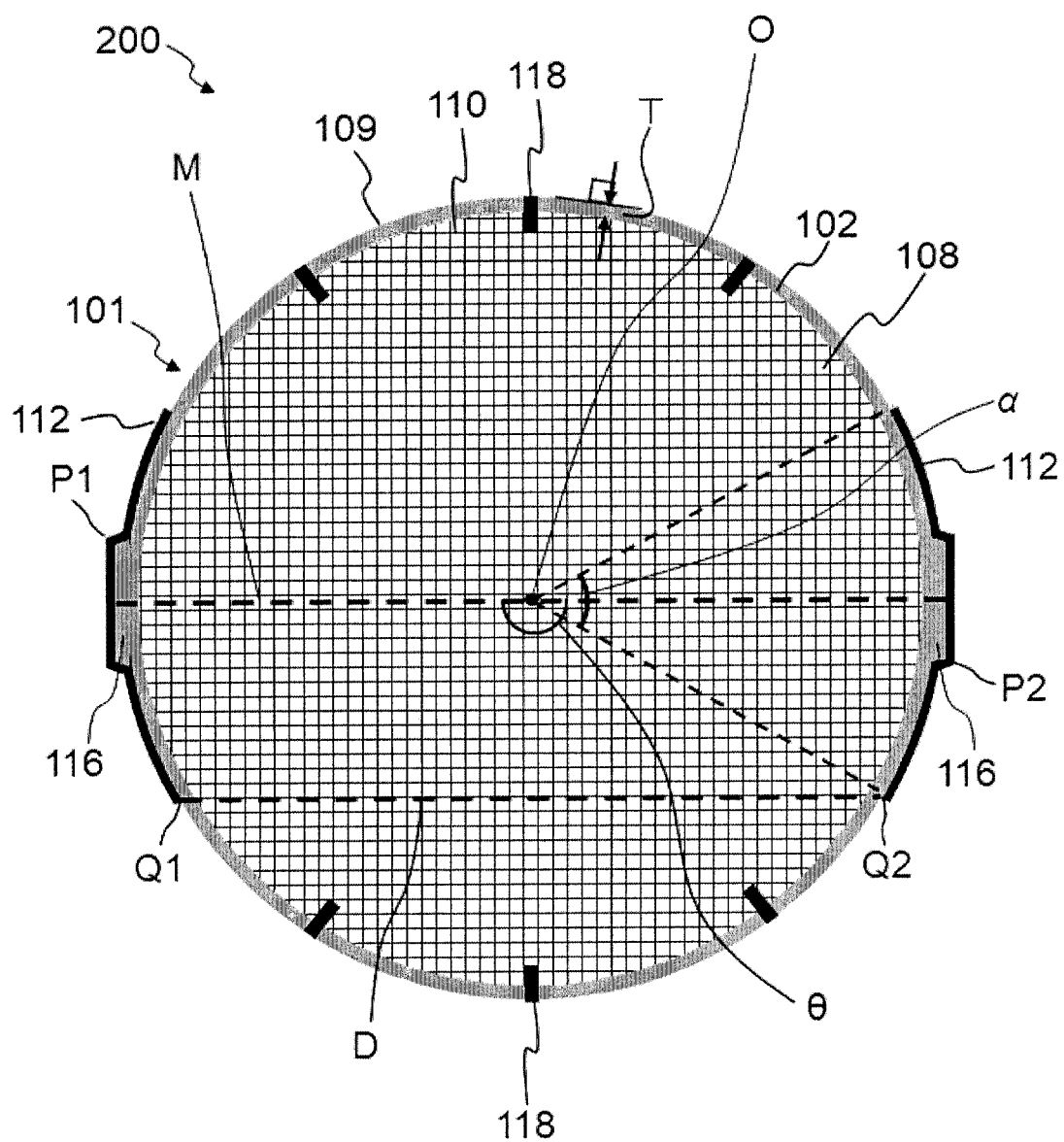

CONDUCTIVE HONEYCOMB STRUCTURE

TECHNICAL FIELD

Field of the Invention

The present invention relates to a conductive honeycomb structure. More particularly, the present invention relates to a honeycomb structure that is suitable for use in application of supporting a catalyst for exhaust gas purification and rapidly increasing a temperature to an activation temperature of the catalyst.

Background Art

A catalyst supported on a pillar-shaped honeycomb structure including a plurality of partition walls that partition and form a plurality of cells penetrating from a first end face to the second end face to form flow paths has been conventionally used for purifying harmful substances such as HC, CO, and NOx contained in exhaust gas discharged from an engine of an automobile or the like. Thus, when treating the exhaust gas with the catalyst supported on the honeycomb structure, a temperature of the catalyst should be increased to its activation temperature. However, there is a problem in that since the catalyst does not reach the activation temperature at starting of the engine, the exhaust gas is not sufficiently purified. In particular, a plug-in hybrid electric vehicle (PHEV) and a hybrid vehicle (HV) sometimes run only with the motor for its traveling, so that they have lower engine starting frequency and lower catalyst temperature at starting of the engine, thereby tending to deteriorate the exhaust gas purification performance immediately after the engine is started.

In order to solve the problem, a technique has been proposed in which a heater having a honeycomb structure is disposed on the upstream side of the honeycomb structure having a catalyst supported thereon and a temperature of the catalyst is increased (for example, see Japanese Patent No. 2931362). There has been proposed an electric heating catalyst (EHC) in which the catalyst is integrally formed with the heater by disposing a pair of electrode portions and an electrode terminal protruding portion (terminal connecting portion) on the side face of the pillar-shaped honeycomb structure made of conductive ceramics and causing the honeycomb structure itself to generate heat by energization (for example, see International Publication No. WO 2011/043434).

CITATION LIST

Patent Literature

[Patent Literature 1] U.S. Pat. No. 2,931,362
[Patent Literature 2] WO 2011/043434

SUMMARY OF INVENTION

In the technique disclosed in Japanese Patent No. 2931362, the heater is disposed on the upstream side of the honeycomb structure having a catalyst supported thereon. Therefore, in particular, when a flow rate of the exhaust gas is low and heat transfer from the heater is small as in the case where the engine is started, the farther the catalyst is located from the heater, the more the temperature increase of the catalyst is delayed. That is, in the inside of the honeycomb structure as a catalyst carrier, temperature distribution occurs along a flow direction of the exhaust gas, which makes it impossible to cause entire catalyst to function efficiently.

The EHC disclosed in International Publication No. WO 2011/043434 is mounted on a high voltage HEV (HEV equipped with a storage battery of about 400 V). In the control used for warming up of a catalyst by electrifying the EHC before starting the engine (preliminary energization system), the EHC has excellent performance of heating the entire catalyst uniformly, which contributes to the improvement in the exhaust gas purification performance.

However, in recent years, low voltage HEVs (HEVs equipped with a storage battery of 48 V) have been actively produced mainly in Europe. The low voltage HEVs are required to have the exhaust gas purification performance in the control of warming up the catalyst by electrifying the EHC simultaneously with the starting of the engine (simultaneous energization system). As a result of the studies by the present inventors, it has been found that the EHC disclosed in International Publication No. WO 2011/043434 exhibits excellent performance in the preliminary energization system, but there is a problem in that in the simultaneous energization system, the EHC provides low uniformity of the temperature distribution in the honeycomb structure, which makes it impossible to cause the entire catalyst to reach the activation temperature efficiently.

The present invention has been made in view of the above circumstances, and an object of the present invention is to enhance the uniformity of a temperature distribution in a conductive honeycomb structure when fluid passes through such a structure in the simultaneous energization system.

The conventional EHC including EHC disclosed in International Publication No. WO 2011/043434 has high performance of making the temperature distribution inside the EHC uniform when the EHC is heated in a state in which gas does not flow (see FIG. 1(A)). However, since gas flows into the honeycomb structure at the same time as heating of EHC in the simultaneous energization system, the temperature near the end face on the inlet side of the exhaust gas is cooled by the exhaust gas of relatively low temperature at starting of the engine, whereby the catalyst temperature does not easily rise (see FIG. 1(B)). Thus, it becomes impossible to cause the entire catalyst supported on the honeycomb structure to reach the activation temperature efficiently.

Based on the above-described result of the studies, the present inventors have considered that it is useful to generate the heat preferentially near the end face on the inlet side of the honeycomb structure. According to such a configuration, when the EHC is heated in a state in which gas does not flow, the temperature near the inlet rises quickly, which causes low uniformity of the temperature distribution (see FIG. 1(C)). However, since the temperature near the inlet does not easily rise in the simultaneous energization system, it has been found that the uniformity of the temperature distribution in the EHC can be significantly improved at starting of the engine by adopting such a configuration (see FIG. 1(D)).

The present invention has been made based on the above-described findings, in one aspect, there is provided a conductive honeycomb structure, comprising:

a pillar-shaped conductive honeycomb structure portion having:

an outer peripheral side wall; and partition walls disposed inside the outer peripheral side wall defining a plurality of cells to form flow paths so that fluid can enter the flow paths through a first end face and exit through a second end face;

wherein a pair of electrode layers extending in a flow path direction of the cells constitutes a part of an outer surface of the outer peripheral side wall, one electrode layer of the pair of electrode layers is disposed on a side opposite to the other electrode layer across a central axis of the honeycomb structure portion, and when the honeycomb structure is divided into four equal portions in the flow path direction of the cells to form four regions of A, B, C, and D from a side closer to the first end face, and an average value of electric resistances measured between two points in each of the four regions is represented as $R_A$, $R_B$, $R_C$, and $R_D$ in this order from the side closer to the first end face, a relational expression of $R_A \leq R_B \leq R_C \leq R_D$ (excluding $R_A = R_B = R_C = R_D$) is satisfied provided that the two points being determined so that a distance between the pair of electrode layers is the longest in the cross section perpendicular to the flow path direction of the cells, however, when there is no pair of electrode layers in such a cross section, the two points being determined so that a distance between the two points is the longest in the cross section.

In one embodiment of the conductive honeycomb structure according to the present invention, as to $R_A$, $R_B$, $R_C$, and $R_D$, a relational expression of $R_A < R_B < R_C < R_D$ is satisfied.

In another embodiment of the conductive honeycomb structure according to the present invention, when the pair of electrode layers is divided into four equal portions in the flow path direction of the cells to form four regions of A, B, C, and D from the side closer to the first end face, and an average value of distances between two points in each of the four regions is represented as $D_A$, $D_B$, $D_C$, and $D_D$ in this order from the side closer to the first end face, a relational expression of $D_A \leq D_B \leq D_C \leq D_D$ (excluding $D_A = D_B = D_C = D_D$) is satisfied provided that the two points being determined so that a distance between the pair of electrode layers is the shortest in the cross section perpendicular to the flow path direction of the cells.

In still another embodiment of the conductive honeycomb structure according to the present invention, as to $D_A$, $D_B$, $D_C$, and $D_D$, a relational expression of $D_A < D_B < D_D < D_D$ is satisfied.

In yet another embodiment of the conductive honeycomb structure according to the present invention, each of the electrode layers has one end in a region from 0 to 5% from the first end face of the honeycomb structure portion, and the other end in a region from 0 to 75% from the first end face of the honeycomb structure portion relative to a length in the flow path direction of the cells from the first end face to the second end face of the honeycomb structure portion, so that the electrode layer is extended from the one end to the other end in the flow path direction of the cells.

In further embodiment of the conductive honeycomb structure according to the present invention, each of the electrode layers has one end in a region from 0 to 5% from the first end face of the honeycomb structure portion, and the other end in a region from 0 to 50% from the first end face of the honeycomb structure portion relative to a length in the flow path direction of the cells from the first end face to the second end face of the honeycomb structure portion, so that the electrode layer is extended from the one end to the other end in the flow path direction of the cells.

In further embodiment of the conductive honeycomb structure according to the present invention, the electrode layers are formed so as to be line-symmetric with respect to a line connecting center points in a circumferential direction of the electrode layers when observed at any cross section perpendicular to the flow path direction of the cells.

In still further embodiment of the conductive honeycomb structure according to the present invention, a mark indicating a fluid flow direction is provided on the honeycomb structure.

In yet further embodiment of the conductive honeycomb structure according to the present invention, when the honeycomb structure from which the electrode layers are removed is divided into four equal portions in the flow path direction of the cells, and the following electric resistances (1) to (9) are measured as to each of the four portions equally divided:

(1) an electric resistance in the flow path direction of the cells between a center of gravity of one end face and the center of gravity of another end face, (2) an electric resistance in any one direction of in-plane directions of the one end face between a center of gravity of such an end face and an outer peripheral edge of the honeycomb structure portion, (3) an electric resistance in an in-plane direction of the one end face between the center of gravity of such an end face and the outer peripheral edge of the honeycomb structure portion, the in-plane direction being different by 90° from the direction defined in (2), (4) an electric resistance in an in-plane direction of the one end face between the center of gravity of such an end face and the outer peripheral edge of the honeycomb structure portion, the in-plane direction being different by 180° from the direction defined in (2), (5) an electric resistance in an in-plane direction of the one end face between the center of gravity of such an end face and the outer peripheral edge of the honeycomb structure portion, the in-plane direction being different by 270° from the direction defined in (2), (6) an electric resistance in any one direction of in-plane directions of the other end face between a center of gravity of such an end face and an outer peripheral edge of the honeycomb structure portion, (7) an electric resistance in an in-plane direction of the other end face between the center of gravity of such an end face and the outer peripheral edge of the honeycomb structure portion, the in-plane direction being different by 90° from the direction defined in (6), (8) an electric resistance in an in-plane direction of the other end face between the center of gravity of such an end face and the outer peripheral edge of the honeycomb structure portion, the in-plane direction being different by 180° from the direction defined in (6), and (9) an electric resistance in an in-plane direction of the other end face between the center of gravity of such an end face and the outer peripheral edge of the honeycomb structure portion, the in-plane direction being different by 270° from the direction defined in (6), to obtain an average value of the electric resistances in each direction of the four portions, the electric resistance in each of the nine directions of each of the four portions falls within a range of ±10% relative to the average value of the electric resistances in the corresponding direction.

In still further embodiment of the conductive honeycomb structure according to the present invention, when the pair of electrode layers is divided into four equal portions in the flow path direction of the cells to form four regions of A, B, C, and D from the side closer to the first end face, and an average value of electric resistivities of material constituting the pair of electrode layers in each of the above-described four regions is represented as $r_A$, $r_B$, $r_C$, and $r_D$ in this order from the side closer to the first end face, a relational expression of $r_A \leq r_B \leq r_C \leq r_D$ (excluding $r_A=r_B=r_C=r_D$) is satisfied.

In still further embodiment of the conductive honeycomb structure according to the present invention, a part of the outer peripheral side wall comprises an electrically insulative slit extending in the flow path direction of the cells, the slit being disposed between the outer peripheral side wall portions where the pair of electrode layers each constitute the outer surface.

The present invention enables the uniformity of a temperature distribution in a conductive honeycomb structure to be enhanced when fluid passes through such a structure. For example, when the catalyst is supported on the conductive honeycomb structure according to the present invention and the exhaust gas of a low temperature which passes through such a structure is purified, the inlet portion in which the temperature is likely to drop can more strongly generate the heat. Thus, the uniformity of the temperature distribution in such a structure is improved, and therefore the improvement of the catalyst utilization in the inlet portion is expected. Especially, the conductive honeycomb structure according to the present invention is preferably applied to an automobile exhaust gas purification system performing simultaneous energization control by which the catalyst is warmed up by electrifying the conductive honeycomb structure simultaneously with the starting of the engine, and it is expected to contribute to the improvement in the exhaust gas purification performance.

BRIEF DESCRIPTION OF THE DRAWINGS

FIG. 1 is a schematic diagram for illustrating the inventive concept of the present invention;

FIG. 2-1 is a schematic perspective view of a honeycomb structure according to one embodiment of the present invention;

FIG. 2-2 is a schematic perspective view illustrating a case where terminal connecting portions are provided on the honeycomb structure according to one embodiment of the present invention;

FIG. 3 is a schematic diagram of the honeycomb structure according to one embodiment of the present invention when observed at a cross section perpendicular to a flow path direction of cells;

FIG. 4 is a conceptual diagram illustrating various modifications of the honeycomb structure according to the present invention;

FIG. 5 is a diagram illustrating a test procedure for measuring various electric resistances of the conductive honeycomb structure according to the present invention.

FIG. 6 is temperature rise curves in the honeycomb structure of Comparative Example 1 and Example 1.

FIG. 7 is a schematic perspective view of a honeycomb structure according to another embodiment of the present invention; and FIG. 8 is a schematic diagram of the honeycomb structure according to another embodiment of the present invention when observed at a cross section perpendicular to a flow path direction of cells.

DESCRIPTION OF THE PREFERRED EMBODIMENTS

Embodiments of the present invention will now be described in detail with reference to the drawings. It should be understood that the present invention is not intended to be limited to the following embodiments, and any change, improvement or the like of the design may be appropriately added based on ordinary knowledge of those skilled in the art without departing from the spirit of the present invention.

<1. Conductive Honeycomb Structure>

Referring now to FIG. 2-1, a conductive honeycomb structure 100 includes a pillar-shaped honeycomb structure portion 101 comprising an outer peripheral side wall 102 and partition walls 110 disposed inside the outer peripheral side wall 102 defining a plurality of cells 108 to form flow paths so that fluid can enter the flow paths through a first end face 104 and exit through a second end face 106. The outer peripheral side wall 102 of the conductive honeycomb structure 100 includes a pair of electrode layers 112 extending in the flow path direction of the cells. One electrode layer of the pair of electrode layers 112 is disposed on a side opposite to the other electrode layer across a central axis of the honeycomb structure portion 101.

When a terminal is connected to each of the pair of electrode layers 112 and a voltage is applied to the pair of electrode layers 112, the conductive honeycomb structure 100 can generate heat due to Joule heat generated by energization. A terminal connecting portion 103 for connecting the terminal may be provided and connected to each of the electrode layers 112 to facilitate connection of the terminal to the electrode layer 112 (FIG. 2-2). The honeycomb structure 100 can be suitably used as a heater. Furthermore, the honeycomb structure 100 may be used as a catalyst body by supporting a catalyst on the honeycomb structure 100. For example, fluid such as automobile exhaust gas can flow through the flow paths of the plurality of cells 108. The voltage to be applied may be changed as needed, may be, but is not particularly limited to, from 12 to 900 V. When the honeycomb structure 100 is applied to an automobile exhaust gas purification system performing simultaneous energization control in the low vehicle HEV, the voltage to be applied may be from 12 to 100 V, for example, from 20 to 60 V.

A mark indicating a fluid flow direction may be provided on the honeycomb structure to prevent the first end face 104 as a fluid inlet from being mistaken for the second end face 106 as a fluid outlet. Although any method that can recognize the fluid flow direction may be used as a method of providing a mark, an example of the method of providing a mark includes a method of drawing an arrow in ink or the like on the outer peripheral side wall 102 of the conductive honeycomb structure 100.

(1-1 Electrode Layer)

Referring now to FIG. 3, the outer peripheral side wall 102 of the conductive honeycomb structure 100 includes the pair of electrode layers 112 extending in the flow path direction of the cells across a central axis O of the honeycomb structure portion 101. In this case, the electrode layers 112 each constitute a part of an outer surface of the outer peripheral side wall 102. The electrode layers 112 can serve to spread the current in the circumferential direction and in the flow path direction to enhance the uniform heat generation. In terms of enhancing the uniform heat generation in the circumferential direction of the honeycomb structure 100, the electrode layers 112 are preferably formed so as to be line-symmetric with respect to a center line M connecting center points in the circumferential direction of the electrode layers 112 when observed at any cross section perpendicular to the flow path direction of the cells (FIG. 3).

In the cross section perpendicular to the flow path direction of the cells 108, an angle $\theta$ (0°≤$\theta$≤180°) formed by two line segments extending from the respective circumferential centers of the pair of electrode layers 112 to the central axis O of the honeycomb structure portion 101 is preferably 150°≤θ≤180°, and more preferably 160°≤θ≤180°, and even more preferably 170°≤θ≤180°, and most preferably 180° (FIG. 3).

When the outer peripheral side wall 102 of the conductive honeycomb structure 100 is provided with the electrode layers 112, it is preferable that at least one of two or more terminal connecting portions 103 is disposed on each of the electrode layers 112 to be in contact with the electrode layers 112 in terms of enhancing the uniformity of the temperature distribution of the honeycomb structure 100. Moreover, it is more preferable that the number of the terminal connecting portions 103 disposed on each of the electrode layers is the same as each other. In an exemplary embodiment, a pair of terminal connecting portions 103 disposed on the respective circumferential centers of the electrode layers 112 are disposed to face each other across the central axis of the honeycomb structure portion 101.

In one embodiment of the conductive honeycomb structure 100, when the honeycomb structure 100 is divided into four equal portions in the flow path direction of the cells to form four regions of A, B, C, and D from the side closer to the first end face (a fluid inlet), and an average value of electric resistances measured between two points (electric resistances between P1 and P2 in FIG. 3) in each of the above-described four regions is represented as $R_A$, $R_B$, $R_C$, and $R_D$ in this order from the side closer to the first end face, a relational expression of $R_A \leq R_B \leq R_C \leq R_D$ (excluding $R_A = R_B = R_C = R_D$) is satisfied provided that the two points being determined so that a distance between the pair of electrode layers is the longest in the cross section perpendicular to the flow path direction of the cells. Note that when there is no pair of electrode layers in such a cross section, the two points are determined so that a distance between the two points is the longest in the cross section. Thus, since an energization resistance decreases stepwise from the outlet to the inlet of the fluid in the honeycomb structure 100, the effect is obtained that the honeycomb structure easily generates heat closer to the inlet. In the present invention, the electric resistance between the above-described electrode layers 112 is defined as a value measured at 25° C. by a four-terminal method.

To generate the heat preferentially near the inlet of the honeycomb structure 100, as to $R_A$, $R_B$, $R_C$, and $R_D$, the relational expression of $R_A \leq R_B \leq R_C \leq R_D$ (excluding $R_A = R_B = R_C = R_D$) is preferably satisfied, and the relational expression of $R_A < R_B < R_C < R_D$ is more preferably satisfied, and the relational expression of $R_A < 0.7 R_B < 0.6 R_C < 0.5 R_D$ is even more preferably satisfied.

The electric resistance measured between two points determined so that a distance between the pair of electrode layers is the longest in the cross section perpendicular to the flow path direction of the cells can be adjusted by changing, for example, one or more of (1) a distance between two points determined so that the distance between the pair of electrode layers is the shortest in the cross section perpendicular to the flow path direction of the cells, (2) the electric resistivity of the material forming each of the electrode layers, and (3) the thickness of each of the electrode layers. When the distance between two points determined so that the distance between the pair of electrode layers is the shortest is shorter, the above-described electric resistance becomes small, and conversely, when the distance between two points determined so that the distance between the pair of electrode layers is the shortest is longer, the above-described electric resistance becomes larger. When the electric resistivity of the material forming each of the electrode layers becomes small, the above-described electric resistance becomes small, and conversely, when the electric resistivity of the material forming each of the electrode layers becomes large, the above-described electric resistance becomes large. When the thickness of the electrode layers becomes large, the above-described electric resistance becomes small, and conversely, when the thickness of the electrode layers becomes small, the above-described electric resistance becomes large.

In one embodiment of the conductive honeycomb structure 100, when the pair of electrode layers 112 is divided into four equal portions in the flow path direction of the cells to form four regions of A, B, C, and D from the side closer to the first end face, and an average value of distances between two points (distances between Q1 and Q2 in FIG. 3) in each of the above-described four regions is represented as $D_A$, $D_B$, $D_C$, and $D_D$ in this order from the side closer to the first end face, a relational expression of $D_A \leq D_B \leq D_C \leq D_D$ (excluding $D_A = D_B = D_C = D_D$) is satisfied provided that the two points being determined so that a distance between the pair of electrode layers is the shortest in the cross section perpendicular to the flow path direction of the cells.

To generate the heat more preferentially near the inlet of the honeycomb structure 100, as to $D_A$, $D_B$, $D_C$, and $D_D$, the relational expression of $D_A \leq D_B \leq D_C \leq D_D$ (excluding $D_A = D_B = D_C = D_D$) is preferably satisfied, and the relational expression of $D_A < D_B < D_C < D_D$ is more preferably satisfied, and the relational expression of $D_A < 0.83 D_B < 0.73 D_C < 0.68 D_D$ is even more preferably satisfied.

As to the electrode layers 112 in any region of the above-described four regions, in the cross section perpendicular to the flow path direction of the cells, a central angle α formed by the two line segments connecting both side ends of the respective electrode layers 112 in the circumferential direction to the central axis O is preferably 30° or more, and more preferably 40° or more, and still more preferably 60° or more, in terms of spreading the current in the circumferential direction to enhance the uniform heat generation (FIG. 3). However, if the central angle α is too large, the current passing through the inside of the honeycomb structure portion 101 is decreased, and the current passing near the outer peripheral side wall 102 is increased. Therefore, the central angle α is preferably 140° or less, and more preferably 130° or less, and still more preferably 120° or less, in terms of the uniform heat generation of the honeycomb structure portion 101.

To generate the heat preferentially near the inlet of the honeycomb structure 100, each of the electrode layers 112 preferably has one end in a region from 0 to 5% from the first end face 104 relative to a length in the flow path direction of the cells from the first end face 104 to the second end face 106 of the honeycomb structure portion 101. Furthermore, each of the electrode layers 112 preferably has the other end in a region from 0 to 75% from the first end face 104, and still more preferably has the other end in a region from 0 to 50% from the first end face 104 relative to the length in the flow path direction of the cells from the first end face 104 to the second end face 106 of the honeycomb structure portion 101, in terms of enhancing the uniformity of the temperature distribution in the flow path direction of the cells of the honeycomb structure 100.

In one embodiment of the conductive honeycomb structure 100, when the pair of electrode layers 112 is divided into four equal portions in the flow path direction of the cells to form four regions of A, B, C, and D from the side closer to the first end face, an average value of electric resistivities of material constituting the pair of electrode layers in each of the above-described four regions is represented as $r_A$, $r_B$, $r_C$, and $r_D$ in this order from the side closer to the first end face, a relational expression of $r_A \leq r_B \leq r_C \leq r_D$ (excluding $r_A = r_B = r_C = r_D$) is satisfied.

To generate the heat more preferentially near the inlet of the honeycomb structure 100, as to $r_A$, $r_B$, $r_C$, and $r_D$, the relational expression of $r_A \leq r_B \leq r_C \leq r_D$ (excluding $r_A = r_B = r_C = r_D$) is preferably satisfied, and the relational expression of $r_A < r_B < r_C < r_D$ is more preferably satisfied, and the relational expression of $r_A < 0.25 r_B < 0.125 r_C < 0.1 r_D$ is even more preferably satisfied.

As to the electrode layers 112 in any region of the above-described four regions, by setting the electric resistivity of the electrode layers 112 so as to be lower than the electric resistivity of a part of the honeycomb structure portion 101 disposed inside the electrode layers 112 (part of the outer peripheral side wall disposed inside the electrode layers, and the partition walls), electricity preferentially flows to the electrode layers, and the electricity tends to easily spread in the flow path direction of the cells and in the circumferential direction during energization. The electric resistivity of the electrode layers 112 is preferably 1/10 or less, more preferably 1/20 or less, and even more preferably 1/30 or less, of the electric resistivity of the honeycomb structure portion 101. However, if the difference between the electric resistivities of both is too large, the current concentrates between the end portions of the electrode layers facing each other and the heat generation of the honeycomb structure portion is biased, so that the electric resistivity of the electrode layers 112 is preferably 1/200 or more, and more preferably 1/150 or more, and still more preferably 1/100 or more, of the electric resistivity of the honeycomb structure portion 101. In the present invention, the electric resistivity of the electrode layers 112 is defined as a value measured at 25° C. by four-terminal method.

In one embodiment of the conductive honeycomb structure 100, when the pair of electrode layers 112 is divided into four equal portions in the flow path direction of the cells to form four regions of A, B, C, and D from the side closer to the first end face, and an average value of thicknesses of the pair of electrode layers in each of the above-described four regions is represented as $U_A$, $U_B$, $U_C$, and $U_D$ in this order from the side closer to the first end face, a relational expression of $U_A \geq U_B \geq U_C \geq U_D$ (excluding $U_A = U_B = U_C = U_D$) is satisfied.

To generate the heat more preferentially near the inlet of the honeycomb structure 100, as to $U_A$, $U_B$, $U_C$, and $U_D$, the relational expression of $U_A \geq U_B \geq U_C \geq U_D$ (excluding $U_A = U_B = U_C = U_D$) is preferably satisfied, and the relational expression of $U_A > U_B > U_C > U_D$ is more preferably satisfied, and the relational expression of $U_A > 10 U_D$ is even more preferably satisfied.

As to the electrode layers 112 in any region of the above-described four regions, the thickness of the electrode layers 112 is preferably from 0.01 to 5 mm, and more preferably 0.01 to 3 mm. When the thickness of the electrode layers 112 is less than 0.01 mm, the electric resistance is increased so that the temperature distribution may not be controlled. When the thickness is more than 5 mm, breakage may occur during canning. The thickness of the electrode layers 112 is defined as a thickness in a normal direction relative to a tangential line of the outer surface of each of the electrode layers 112 at a position to measure the thickness of each of the electrode layers 112, when observed at a cross section perpendicular to the flow path direction of the cells.

FIG. 4 is a conceptual diagram illustrating various modifications including the above-described embodiment of the conductive honeycomb structure according to the present invention.

In an embodiment illustrated in FIG. 4(A), the electrode layers 112 extend over the full length of the flow path of the cell. Furthermore, the width of the electrode layers 112 in the circumferential direction grows narrower in the downstream direction, and the relational expression of $D_A < D_B < D_C < D_D$ (the definition is as described above) is satisfied.

In an embodiment illustrated in FIG. 4(B), the electrode layers 112 extend over the full length of the flow path of the cell. The electrode layers 112 are formed so that the electric resistivity is increased stepwise from the inlet side, and the relational expression of $r_A < r_B < r_C < r_D$ (the definition is as described above) is satisfied.

In an embodiment illustrated in FIG. 4(C), the electrode layers 112 have one end in a region from 0 to 5% from the first end face 104 and have the other end in a region from 20 to 50% from the first end face 104, relative to the full length of the flow path of the cell.

In an embodiment illustrated in FIG. 4(D), the electrode layers 112 have one end in a region from 0 to 5% from the first end face 104 and have the other end in a region from 20 to 50% from the first end face 104, relative to the full length of the flow path of the cell. Furthermore, the width of the electrode layers 112 in the circumferential direction grows narrower in the downstream direction, and the relational expression of $D_A < D_B < D_C < D_D$ (the definition is as described above) is satisfied.

FIG. 4(E) is presented as a comparative example. In FIG. 4(E), the electrode layers 112 extend over the full length of the flow path of the cell. Furthermore, the width of the electrode layers in the circumferential direction is constant, and the relational expression of $D_A = D_B = D_C = D_D$ (the definition is as described above) is satisfied. Thus, no configuration is devised so as to generate the heat preferentially near the inlet, and if the temperature of the gas flowing into the inlet is low, the temperature near the inlet of the honeycomb structure portion is likely to drop.

Metals and conductive ceramics can be used as the material of the electrode layers 112. Examples of the metals include elemental metal of Ag, Cu, Ni, Au, Pd, Cr, Fe, Co, Ni, Si or Ti or alloy containing at least one metal selected from the group consisting of these metals. Examples of the conductive ceramics include, but not limited to, silicon carbide (SiC), metal compounds such as metal silicides including tantalum silicide ($TaSi_2$) and chromium silicide ($CrSi_2$). They also include composite materials (cermet) comprised of a combination of at least one of the conductive ceramics as listed above with at least one of the metals as listed above. Specific examples of the cermet include composite materials of metallic silicon and silicon carbide, composite materials of metal silicides such as tantalum silicide or chromium silicide with metallic silicon and silicon carbide. They also include composite materials obtained by adding one or two or more of insulating ceramics such as alumina, mullite, zirconia, cordierite, silicon nitride and aluminum nitride to one or two or more of the above metals in terms of reduction of thermal expansion. It is preferable that the material of the electrode layers 112 be a combination of the metal silicides such as tantalum silicide and chromium silicide with the composite materials of metallic silicon and silicon carbide, among the various metals and conductive ceramics as listed above, because it can be fired at the same time as the honeycomb structure portion, so that it can contribute to simplification of the production steps.

(1-2 Honeycomb Structure Portion)

As described above, in the conductive honeycomb structure 100, a configuration of each the electrode layers is devised so as to generate the heat preferentially near the inlet of the honeycomb structure 100 when the electricity is applied. On the other hand, as to a part of the honeycomb structure portion 101 disposed inside the electrode layers 112 (part of the outer peripheral side wall disposed inside the electrode layers, and the partition walls), it is preferable that the material is not changed in the flow path direction of the cell in terms of production efficiency and production costs, when the honeycomb structure 100 is industrially produced by extrusion molding.

Accordingly, in one embodiment, when the conductive honeycomb structure 100 from which the electrode layers 112 are removed (see FIG. 5(B)) is divided into four equal portions in the flow path direction of the cells (see FIG. 5(C)), and the following electric resistances (1) to (9) are measured as to each of the four portions equally divided:

(1) an electric resistance in the flow path direction of the cells between a center of gravity of one end face and the center of gravity of another end face, (2) an electric resistance in any one direction of in-plane directions of the one end face between a center of gravity of such an end face and an outer peripheral edge of the honeycomb structure portion, (3) an electric resistance in an in-plane direction of the one end face between the center of gravity of such an end face and the outer peripheral edge of the honeycomb structure portion, the in-plane direction being different by 90° from the direction defined in (2), (4) an electric resistance in an in-plane direction of the one end face between the center of gravity of such an end face and the outer peripheral edge of the honeycomb structure portion, the in-plane direction being different by 180° from the direction defined in (2), (5) an electric resistance in an in-plane direction of the one end face between the center of gravity of such an end face and the outer peripheral edge of the honeycomb structure portion, the in-plane direction being different by 270° from the direction defined in (2), (6) an electric resistance in any one direction of in-plane directions of the other end face between a center of gravity of such an end face and an outer peripheral edge of the honeycomb structure portion, (7) an electric resistance in an in-plane direction of the other end face between the center of gravity of such an end face and the outer peripheral edge of the honeycomb structure portion, the in-plane direction being different by 90° from the direction defined in (6), (8) an electric resistance in an in-plane direction of the other end face between the center of gravity of such an end face and the outer peripheral edge of the honeycomb structure portion, the in-plane direction being different by 180° from the direction defined in (6), and (9) an electric resistance in an in-plane direction of the other end face between the center of gravity of such an end face and the outer peripheral edge of the honeycomb structure portion, the in-plane direction being different by 270° from the direction defined in (6), to obtain an average value of the electric resistances in each direction of the four portions, the electric resistance in each of the above-described nine directions of each of the four portions falls within a range of ±10%, and preferably within a range of ±5%, and more preferably within a range of ±2% relative to the average value of the electric resistances in the corresponding direction. The honeycomb structure having such characteristics can be provided as an integrally molded part.

In the present invention, these electric resistances are defined as values measured at 25° C. by a four-terminal method.

The external shape of the honeycomb structure portion 101 may be any pillar shape. For example, the external shape of the honeycomb structure portion 101 may be a pillar shape with circular bottoms (cylindrical shape), a pillar shape with oval bottoms, a pillar shape with polygonal bottoms (quadrangle, pentagon, hexagon, heptagon and octagon shapes, etc.), or the like. For the size of the honeycomb structure portion 101, an area of the end face is preferably from 2000 to 20000 mm$^2$, and more preferably from 5000 to 15000 mm$^2$, for the reason of improving the heat resistance (preventing cracks generated in the outer peripheral side wall in the circumferential direction).

Referring now to FIG. 3, the outer peripheral side wall 102 may include a pair of protruding portions 116 extending in the flow path direction of the cells across the central axis of the honeycomb structure portion 101. The terminals to be connected to the honeycomb structure 100 are preferably connected to respective positions where the protruding portions 116 are formed. The thickness of the portions having the pair of protruding portions 116 on the outer peripheral side wall 102 is relatively thicker, so that the electric resistance in the flow path direction of the cells (axial direction) decreases, and the current flowing in the terminal connecting portions 103 tends to spread in the flow path direction of the cells. This can lead to improved uniformity of the temperature distribution in the axial direction of the honeycomb structure portion 101.

The material of the honeycomb structure portion 101 may be any conductive material, and metals, ceramics or the like can be used as the material of the honeycomb structure portion 101. The electric resistivity of the honeycomb structure portion 101 may be any electric resistivity which enables the honeycomb structure 100 to generate heat due to Joule heat generated by energization, but the electric resistivity of the honeycomb structure portion 101 is preferably from 0.1 to 200 Ωcm, and more preferably from 0.2 to 100 Ωcm. In the present invention, the electric resistivity of the honeycomb structure portion 101 is defined as a value measured at 25° C. by a four-terminal method.

When the honeycomb structure portion 101 is comprised of a ceramic, the material of the honeycomb structure portion 101 is preferably, but is not limited to, a ceramic mainly based on a silicon-silicon carbide composite material or silicon carbide, and more preferably a silicon-silicon carbide composite material or silicon carbide, in terms of compatibility of heat resistance and electric conductivity. The phrase "the material of the honeycomb structure portion 101 is a ceramic mainly based on a silicon-silicon carbide composite material" as used herein means that 90% by mass or more of the whole honeycomb structure portion 101 contains the silicon-silicon carbide composite material (total mass). Here, the silicon-silicon carbide composite material contains silicon carbide particles as an aggregate and silicon as a binder for bonding the silicon carbide particles to each other, and it is preferable that a plurality of silicon carbide particles be bonded by silicon such that pores are formed between the silicon carbide particles. The phrase "the material of the honeycomb structure portion 101 is a ceramic mainly based on silicon carbide" as used herein means that 90% by mass or more of the whole honeycomb structure portion 101 contains the silicon carbide (total mass).

When the material of the honeycomb structure portion 101 is the silicon-silicon carbide composite material, a ratio of the "mass of the silicon as a binder" contained in the honeycomb structure portion 101 to the total of the "mass of the silicon carbide particles as an aggregate" contained in the honeycomb structure portion 101 and the "mass of silicon as a binder" contained in the honeycomb structure portion 101 is preferably from 10 to 40% by mass, and more preferably from 15 to 35% by mass. When it is lower than 10% by mass, the strength of the honeycomb structure portion 101 may be decreased. When it is higher than 40% by mass, the shape may not be retained during firing.

The shape of the cell in the cross section perpendicular to the flow path direction of the cells includes, but is not limited to, preferably a quadrangle, a hexagon, an octagon, or a combination thereof. Among them, quadrangle and hexagon are preferable. Such a cell shape results in decreased pressure loss when allowing the exhaust gas to flow through the honeycomb structure, thereby providing improved purification performance of the catalyst. The rectangle is particularly preferable from the viewpoint of tending to achieve both of the structure strength and the uniformity of the temperature distribution in the honeycomb structure.

The thickness of the partition walls 110 for partitioning and defining the cells 108 is preferably from 0.1 to 0.3 mm, and more preferably from 0.15 to 0.25 mm. The thickness of the partition walls 110 of 0.1 mm or more allows suppression of a decrease in the strength of the honeycomb structure. The thickness of the partition walls 110 of 0.3 mm or less allows suppression of an increase in the pressure loss during flowing of the exhaust gas when the catalyst is supported using the honeycomb structure as a catalyst carrier. In the present invention, the thickness of each partition wall 110 is defined as a length of a portion crossing the partition wall 110, of a line segment connecting the centers of gravity of adjacent cells 108, in the cross section perpendicular to the flow path direction of the cells 108.

In the cross section perpendicular to the flow path direction of the cells 108, the honeycomb structure 100 preferably has a cell density of from 40 to 150 cells/cm$^2$, and more preferably from 70 to 100 cells/cm$^2$. The cell density in such a range allows the purification performance of the catalyst to be improved while reducing the pressure loss during flowing of the exhaust gas. When the cell density is lower than 40 cells/cm$^2$, the catalyst supporting area may be reduced. When the cell density is higher than 150 cells/cm$^2$, the pressure loss during flowing of the exhaust gas may become larger when the catalyst is supported using the honeycomb structure 100 as a catalyst carrier. The cell density is a value obtained by dividing the number of cells by the area of the first end face portion of the honeycomb structure portion 101 excluding the outer peripheral side wall 102 portion.

Providing the outer peripheral side wall 102 of the honeycomb structure 100 is useful in terms of ensuring the structural strength of the honeycomb structure 100 and preventing the fluid flowing through the cells 108 from leaking from the outer peripheral side wall 102. Specifically, a thickness T of the outer peripheral side wall 102 is preferably 0.1 mm or more, and more preferably 0.15 mm or more, and still more preferably 0.2 mm or more. However, if the thickness of the outer peripheral side wall 102 is excessively high, the strength becomes too high, so that balance between strengths of the outer peripheral side wall 102 and the partition walls 110 is lost and thermal shock resistance is decreased. Therefore, the thickness T of the outer peripheral side wall 102 is preferably 1.0 mm or less, and more preferably 0.7 mm or less, and still more preferably 0.5 mm or less. Here, the thickness T of the outer peripheral side wall 102 is defined as a thickness of the outer peripheral side wall 102 in the normal direction relative to a tangential line of the outer peripheral side wall 102 at a position to measure the thickness of the outer peripheral side wall 102, when observed at a cross section perpendicular to the flow path direction of the cells. FIG. 3 exemplarily illustrates a position to measure the thickness T of the outer peripheral side wall 102.

The partition walls 110 may be porous. The porosity of each partition wall 110 is preferably from 35 to 60%, and more preferably from 35 to 45%. When the porosity is less than 35%, deformation may be increased during firing. When the porosity is more than 60%, the strength of the honeycomb structure may be decreased. The porosity is a value measured by a mercury porosimeter.

The mean pore diameter of the partition walls 110 of the honeycomb structure portion 101 is preferably 2 to 15 and more preferably from 4 to 8 μm. When the mean pore diameter is smaller than 2 μm, the electric resistivity may become too high. When the mean pore diameter is larger than 15 μm, the electric resistivity may become too small. The mean pore diameter is a value measured by a mercury porosimeter.

(1-3 Terminal Connecting Portion)

When the terminal connecting portion is formed in contact with the electrode layer, the shape of the terminal connecting portion may be any shape which allows the terminal to be connected. For example, the terminal connecting portion can be formed to protrude on an outer surface area of the electrode layer 112. In this case, the terminal can be connected to the terminal connecting portion, for example, by pinching the terminal connecting portion with a clip-on terminal or inserting a recessed terminal into the terminal connecting portion coated with the electrode layer. The terminal connecting portion can also be recessed on the outer surface area of the electrode layer 112. In this case, the terminal can be connected to the terminal connecting portion, for example, by inserting a protruding terminal into the terminal connecting portion. Note that at least part of the terminal connecting portion may be coated with the electrode layer 112.

To generate the heat more preferentially near the inlet of the honeycomb structure 100, the terminal connecting portion 103 is preferably disposed only on the outer surface area of the outer peripheral side wall 102 at a distance of not more than 50% from the first end face 104 in the flow path direction of the cells, and more preferably disposed only on the outer surface area of the outer peripheral side wall 102 at a distance of not more than 30%, and still more preferably disposed only on the outer surface area of the outer peripheral side wall 102 at a distance of not more than 20%, relative to the full length of the flow path of the cell. However, if the terminal connecting portion 103 is too close to the inlet side, the terminal connecting portion 103 interferes with a member connected to the upstream side of the conductive honeycomb structure 100, which makes it difficult to connect the member to the upstream side of the conductive honeycomb structure 100. Therefore, it is preferable that the terminal connecting portion 103 be not disposed on the outer surface area of the outer peripheral side wall 102 at a distance of not more than 5% from the first end face 104 in the flow path direction of the cells, relative to the full length of the flow path of the cell, and it is more preferable that the terminal connecting portion 103 be not disposed on the outer surface area of the outer peripheral side wall 102 at a distance of not more than 10% from the first end face 104 in the flow path direction of the cells, relative to the full length of the flow path of the cell.

Since the terminal connecting portion is exposed to an exhaust gas atmosphere, the terminal connecting portion preferably has corrosion resistance. Examples of the material of the terminal connecting portion can include alloys containing at least one selected from the group consisting of Si, Cr, Fe, Co, Ni, and Ti or ceramic containing SiC.

When the principal component of the honeycomb structure portion is a silicon-silicon carbide composite material or silicon carbide, it is preferable that the principal component of the terminal connecting portion is a silicon-silicon carbide composite material or silicon carbide. Thus, the terminal connecting portion has a silicon-silicon carbide composite material or silicon carbide as a principal component, so that the components of the honeycomb structure portion is the same as (or close to) those of the terminal connecting portion. Thus, a coefficient of thermal expansion of the honeycomb structure portion becomes the same as (or close to) that of the terminal connecting portion. Since the material of the honeycomb structure portion is the same as (or close to) that of the terminal connecting portion, the joint strength between the honeycomb structure portion and the terminal connecting portion is increased. Thus, the terminal connecting portion can be prevented from being detached from the honeycomb structure portion and a joint portion between the terminal connecting portion and the honeycomb structure portion can be prevented from being broken, even when thermal stress is applied to the honeycomb structure portion. Here, the phrase "the terminal connecting portion has a silicon-silicon carbide composite material as a principal component" as used herein means that 90% by mass or more of the whole terminal connecting portion contains the silicon-silicon carbide composite material (total mass). The phrase "the terminal connecting portion has silicon carbide as a principal component" as used herein means that 90% by mass or more of the whole terminal connecting portion contains the silicon carbide (total mass).

(1-4 Slit)

FIG. 7 is a schematic perspective view of a honeycomb structure 200 according to another embodiment of the present invention. FIG. 8 is a schematic diagram of the conductive honeycomb structure 200 when observed at a cross section perpendicular to a flow path direction of cells. The same reference numerals as previously used represent like components, and thus the description thereof is omitted. The honeycomb structure 200 is different from the honeycomb structure 100 in that a part of the outer peripheral side wall 102 includes one or more electrically insulative slits 118 extending in the flow path direction of the cells. The one or more slits 118 are disposed between the outer peripheral side wall portions where the pair of electrode layers 112 each constitute the outer surface 109. When the slits are provided on a part of the outer peripheral side wall 102, the thermal shock resistance of the honeycomb structure can be improved.

The slit 118 may be opened on the outer surface 109 of the outer peripheral side wall 102, and extend to one or both of the first end face 104 and the second end face 106 to have open ends in these end faces. The electrically insulative slit 118 refers to the case where at least part of an internal space of the slit is filled with an insulative filler material in addition to the case where the slit is opened (insulated by air). Forming the electrically insulative slit 118 can disturb the current flowing through the outer periphery side wall 102 between the pair of electrode layers 112 of the honeycomb structure 200, thereby preventing a short circuit between the pair of electrode layers 112. Filling the slit 118 with the filler material enables the thermal shock resistance and the isostatic strength of the honeycomb structure 200 to be improved, and the fluid flowing in the flow paths of the cells 108 to be prevented from escaping from the honeycomb structure 200 through the slit 118.

In the honeycomb structure 200, the depth of the slit 118 is preferably from 1 to 80% of a radius in the cross section perpendicular to the flow path direction of the cells of the honeycomb structure portion 101 (hereinafter sometimes referred to as "the radius of the honeycomb structure portion"). Furthermore, the depth of the slit 118 is further preferably from 1 to 60% and especially preferably from 1 to 30% of the radius of the honeycomb structure portion. When the depth of the slit 118 is smaller than 1% of the radius of the honeycomb structure 200, an effect of improving the thermal shock resistance by the slit 118 may be hard to be obtained. When the depth of the slit 118 is larger than 80% of the radius of the honeycomb structure portion 101, the flow of the current flowing between the pair of electrode layers is noticeably disturbed by the slit 118, the heat is hindered from being uniformly generated, which may cause the non-uniform heat generation. The depth of each of the slits 118 is a distance from the open end of the slit 118 in the outer surface 109 of the outer peripheral side wall 102 to the deepest position of the slit 118. When a plurality of slits is present, depths of the slits 118 may vary with the slits or all the widths may be the same.

In the honeycomb structure 200, an opening width of the slit 118 is preferably from 0.1 to 5% of a length of an outer circumference of the honeycomb structure portion 101 in the cross section perpendicular to the flow path direction of the cells 108 (hereinafter sometimes referred to as "a circumferential length of the honeycomb structure portion"). Furthermore, the opening width of the slit 118 is further preferably from 0.1 to 3% of the circumferential length of the honeycomb structure portion and is especially preferably from 0.1 to 1% of the circumferential length of the honeycomb structure portion. When the opening width of the slit 118 is smaller than 0.1% of the circumferential length of the honeycomb structure portion, an effect of lowering the thermal shock resistance of the honeycomb structure 200 may deteriorate. When the opening width of the slit 118 is larger than 5% of the circumferential length of the honeycomb structure portion, the mechanical strength of the honeycomb structure 200 may deteriorate. The opening width of the slit 118 is a length of the slit 118 in the circumferential direction of the honeycomb structure portion. The circumferential direction of the honeycomb structure portion is a direction along the outer circumference in the cross section perpendicular to the flow path direction of the cells 108 of the honeycomb structure portion 101. When the plurality of slits is present, the opening widths of the slits 118 may vary with the slits or all the widths may be the same.

When the plurality of slits is present, it is preferable that the slits be arranged to be line-symmetrical with respect to the central line M as a symmetrical axis in terms of the homogeneity.

In the honeycomb structure 200, the number of slits 118 is preferably from 1 to 20, further preferably from 1 to 15, and especially preferably from 1 to 10. When the number of slits 118 is in excess of 20, the mechanical strength of the honeycomb structure 200 may deteriorate. In the honeycomb structure 200 illustrated in FIG. 7 and FIG. 8, six slits 118 are provided.

One or a plurality of slits 118 may be provided on each of the electrode layers 112 to improve the thermal shock resistance of the electrode layers 112 to prevent cracks.

The filler material may contain aggregates and a neck material. The "neck material" enters into the spaces among the aggregate particles to bond and fix the particles to one another. The material of the neck material is not limited to a particular material. For example, the neck material preferably includes at least one selected from the group consisting of silicon oxide, a metal oxide, and a metal compound. Such examples of the neck material are as follows. The neck material may include at least one of silicon oxide and the metal oxide, or the neck material may be constituted of at least one of silicon oxide and the metal oxide. Examples of the metal oxide constituting the neck material include aluminum oxide, titanium oxide, and magnesium oxide.

The filler material preferably contains 2 to 90% by mass of the neck material, further preferably contains 3 to 50% by mass of the neck material, and especially preferably contains 5 to 25% by mass of the neck material. When the mass percentage of the neck material is smaller than 2% by mass, the strength of the filler material may deteriorate. When the neck material is in excess of 90% by mass, the thermal expansion coefficient α2 of the filler material may rise. Furthermore, when an amount of the neck material is excessively large, the strength of the filler material may deteriorate.

The material of the aggregates is not limited to a particular material. Examples of a component to be included in the aggregates is preferably at least one component selected from the group consisting of silicon carbide, cordierite, silicon oxide, aluminum titanate, talc, mica, lithium aluminum titanate, montmorillonite, boehmite, forsterite, kaolin, and mullite. The aggregates preferably include 10 to 100% by mass, further preferably include 50 to 97% by mass and especially preferably include 75 to 95% by mass of at least one component selected from the above-mentioned group. A plurality of types of aggregate may be mixed to be used.

<2. Method of Producing Conductive Honeycomb Structure>

Next, a method of producing the conductive honeycomb structure according to the present invention will be exemplarily described. In one embodiment, the method of producing the honeycomb structure according to the present invention includes step A1 of obtaining a honeycomb formed body, step A2 of firing the honeycomb formed body to obtain a fired honeycomb structure portion, and step A3 of forming an electrode layer on the fired honeycomb structure portion.

In step A1, the honeycomb formed body, which is a precursor of the honeycomb structure portion, is produced and a terminal connecting portion is formed on a side surface of the honeycomb formed body as needed to obtain an unfired honeycomb structure portion. The honeycomb structure portion includes partition walls 110 defining a plurality of cells 108 extending from first end face 104 to the second end face 106, and an outer peripheral side wall 102 located at the outermost circumference, as illustrated in FIG. 2.

The honeycomb formed body can be produced in accordance with a method of making a honeycomb formed body in the known method of producing the honeycomb structure. For example, firstly, a molding material is prepared by adding to silicon carbide powder (silicon carbide), metallic silicon powder (metallic silicon), binder, surfactant, pore former, water and the like. The mass of metallic silicon is preferably from 10 to 40% by mass relative to the total mass of silicon carbide powder and metallic silicon. The mean particle diameter of the silicon carbide particles in the silicon carbide powder is preferably from 3 to 50 μm, and more preferably from 3 to 40 μm. The mean particle diameter of metallic silicon (metallic silicon powder) is preferably from 2 to 35 μm. Each mean particle diameter of the silicon carbide particles and metallic silicon (metallic silicon particles) refers to an arithmetic mean diameter on volume basis when frequency distribution of the particle size is measured by a laser diffraction method. The silicon carbide particles are fine particles of silicon carbide forming the silicon carbide powder, and the metallic silicon particles are fine particles of metallic silicon forming the metal silicon powder. Note that this is the formulation of the molding material when the material of the honeycomb structure portion is the silicon-silicon carbide based composite material, and no metallic silicon is added when the material of the honeycomb structure portion is silicon carbide.

Examples of the binder include methyl cellulose, hydroxypropyl methyl cellulose, hydroxypropoxyl cellulose, hydroxyethyl cellulose, carboxymethyl cellulose, polyvinyl alcohol, and the like. Among them, it is preferable to use methyl cellulose in combination with hydroxypropoxyl cellulose. The content of the binder is preferably from 2.0 to 10.0 parts by mass when the total mass of the silicon carbide powder and the metallic silicon powder is 100 parts by mass.

The content of water is preferably from 20 to 60 parts by mass when the total mass of the silicon carbide powder and the metallic silicon powder is 100 parts by mass.

Examples of the surfactant that can be used include ethylene glycol, dextrin, fatty acid soap, polyalcohol and the like. These may be used alone or in combination with two or more. The content of the surfactant is preferably from 0.1 to 2.0 parts by mass when the total mass of the silicon carbide powder and the metallic silicon powder is 100 parts by mass.

The pore former may be any pore former that forms pores after firing, and includes, for example, graphite, starches, foaming resins, water absorbing resins, silica gel and the like. The content of the pore former is preferably from 0.5 to 10.0 parts by mass when the total mass of the silicon carbide powder and the metallic silicon powder is 100 parts by mass. The mean particle diameter of the pore former is preferably from 10 to 30 μm. When it is smaller than 10 μm, pores may not be formed sufficiently. When it is larger than 30 μm, the pore former may generate clogging of a die during molding. The mean particle diameter of the pore former refers to an arithmetic mean diameter on volume basis when the frequency distribution of the particle size is measured by the laser diffraction method. When the pore former is the water absorbing resin, the mean particle diameter of the pore former refers to the mean particle diameter after water absorption.

Subsequently, the resulting molding material is kneaded to form a green body, and the green body is then subjected to extrusion molding to prepare a honeycomb formed body. In the extrusion molding, a die having a desired overall shape, cell shape, partition wall thickness, cell density and the like can be used. Preferably, the resulting honeycomb formed body is then subjected to drying. When the length in the central axis direction of the honeycomb formed body is not a desired length, both of the bottom portions of the honeycomb formed body can be cut to the desired length. The dried honeycomb formed body is referred to as a honeycomb dried body. One or more slits opened in the side surface of the honeycomb dried body may be formed as needed. The slits are preferably formed by using Leutor or the like.

Subsequently, when a protruding terminal connecting portion 103 is formed, a green body for forming the terminal connecting portion, for example, a green body using the same raw material as the honeycomb formed body is formed into a desired shape to prepare a pair of terminal connecting portions. The pair of terminal connecting portions 103 are attached to the outer surfaces of an outer peripheral side walls 102 facing each other across a central axis of the honeycomb dried body. Alternatively, the outer peripheral side walls 102 facing each other across a central axis of the honeycomb dried body can be drilled to form the recessed terminal connecting portion. In this case, the material of the recessed terminal connecting portion is the same as that of the honeycomb structure portion. The raw material for forming the terminal connecting portion may be further applied to the recessed terminal connecting portion.

In step A2, the unfired honeycomb structure portion is fired to obtain a fired honeycomb structure portion. Before the firing, degreasing may be performed in order to remove the binder and the like. The firing may be preferably carried out by heating the honeycomb formed body in an inert atmosphere such as nitrogen or argon at 1400 to 1500° C. for 1 to 20 hours. After the firing, an oxidation treatment is preferably carried out at 1200 to 1350° C. for 1 to 10 hours in order to improve the durability. The degreasing and firing methods are not limited to particular methods, and may be carried out using an electric furnace, a gas furnace or the like.

In step A3, electrode layers 112 are formed on the fired honeycomb structure portion. The method of preparing the electrode layer forming raw material and the method of applying the electrode layer forming raw material onto the fired honeycomb structure portion can be carried out according to the known method of producing the honeycomb structure. To provide lower electric resistivity of the electrode layers than that of the honeycomb structure portion and/or reduce the electric resistivity according to the electrode layer forming region, the material of the electrode layer may be changed, the content ratio of the metallic silicon may be increased or the particle diameter of the metallic silicon particles may be reduced. After preparing the electrode layer forming raw material, the composition of the electrode layer forming raw material, the thickness of the electrode layer, and the electrode layer forming region are determined so that the electrode layer 112 satisfies the above-mentioned conditions relating to the electric resistance and the electrode layer forming region. The electrode layer forming raw material can be applied to the outer peripheral side wall 102 of the honeycomb structure portion by a suitable method such as thermal spraying and coating according to the electrode layer forming raw material. The electrode layer attaching portion may be fired as needed. By such a procedure, the pair of electrode layers are formed so as to be provided in contact with the outer surfaces of the outer peripheral side walls across the central axis of the honeycomb structure portion.

Then, the slit may be filled with the raw material for the filler material by use of a syringe or the like. For example, the raw material for the filler material can be prepared by kneading a mixture obtained by mixing aggregates, a neck material, a binder, a surfactant, a pore former, water and the like. The raw material for the filler material is preferably slurried. After filling the slit with the filler material, the heat treatment can be performed to make the filler material uniform. As the heat treatment conditions, the heat treatment can be carried out at a temperature of 50 to 100° C. in the atmosphere for 2 to 12 hours.

EXAMPLES

Hereinafter, Examples will be illustrated for better understanding of the present invention and its advantages, but the present invention is not limited to the Examples.

Example 1

(1. Preparation of Cylindrical Green Body)

A ceramic raw material was prepared by mixing silicon carbide (SiC) powder and metallic silicon (Si) powder at a mass ratio of 80:20. To the ceramic raw material were added hydroxypropylmethyl cellulose as a binder and a water absorbing resin as a pore former, as well as water, to form a molding material. The molding material was then kneaded by a vacuum kneader to prepare a cylindrical green body. The content of the binder was 7 parts by mass when the total amount of silicon carbide (SiC) powder and metallic silicon (Si) powder was 100 parts by mass. The content of the pore former was 3 parts by mass when the total amount of silicon carbide (SiC) powder and metallic silicon (Si) powder was 100 parts by mass. The content of water was 42 parts by mass when the total amount of silicon carbide (SiC) powder and metallic silicon (Si) powder was 100 parts by mass. The mean particle diameter of silicon carbide powder was 20 μm and the mean particle diameter of metallic silicon powder was 6 μm. The mean particle diameter of the pore former was 20 μm. Each of the mean particle diameters of silicon carbide powder, metallic silicon powder and pore former refers to an arithmetic mean diameter on volume basis when the frequency distribution of particle size is measured by the laser diffraction method.

(2. Preparation of Honeycomb Dried Body)

The resulting cylindrical green body was molded using an extruder having a grid-like die structure to provide a cylindrical honeycomb formed body including cells each having a square shape in the cross section perpendicular to the flow path direction of the cells. The honeycomb formed body was dried by high frequency induction heating and then further dried at 120° C. for 2 hours by using a hot air drier, and predetermined amounts of both end faces were cut to prepare a honeycomb dried body.

(3. Formation of Terminal Connecting Portion)

A pair of cylindrical terminal connecting portions (diameter of the end face: 12 mm) were molded using a green body having the same composition as the honeycomb formed body. The end faces of the pair of cylindrical terminal connecting portions were attached to the outer surfaces of the outer peripheral side walls facing each other across a central axis of the honeycomb dried body to obtain the unfired honeycomb structure portion with the terminal connecting portions. At this time, each of the terminal connecting portions was disposed in the outer surface area of the outer peripheral side wall so that a center of the end face of the terminal connecting portion is located at a position of 28.5 mm away from the first end face of the honeycomb dried body in the flow path direction of the cells (position of 25% from the first end face in the flow path direction of cells relative to the full length (100%) of the flow path of the cell).

(4. Firing)

The resulting unfired honeycomb structure portion provided with the terminal connecting portions was then degreased, fired and oxidized to prepare a fired honeycomb structure portion provided with the terminal connecting portions. The degreasing was carried out at 550° C. for 3 hours. The firing was carried out in an argon atmosphere at 1450° C. for 2 hours. The oxidation treatment was carried out in the atmosphere at 1300° C. for 1 hour.

(5. Application of Electrode Layer Forming Paste)

A commercially available silver paste as the electrode layer forming paste was applied onto the outer surface of the outer peripheral side wall of the fired honeycomb structure portion at two positions so as to face each other across the central axis and obtain the uniform thickness so that each terminal connecting portion was located at a center of each applied portion in the circumferential direction (θ=0° in FIG. 3). At this time, the silver paste was applied to a side surface of each cylindrical terminal connecting portion. Each applied portion was formed in the form of a band such that the width in the circumferential direction becomes narrower as it comes closer from the first end face to the second end face (a central angle α becomes gradually smaller in the cross section perpendicular to the flow path direction of the cells). The fired honeycomb structure portion after application of the silver paste was dried at 120° C. to obtain a honeycomb structure as a product.

(6. Specification of Honeycomb Structure)

The honeycomb structure obtained in the above-mentioned procedure had circular end faces each having a diameter of 118 mm and a height (a length in the flow path direction of the cells) of 114 mm. The cell density was 93 cells/cm$^2$, the thickness of each partition wall was 101.6 μm, the porosity of the partition walls was 45%, and the mean pore diameter of the partition walls was 8.6 μm. The thickness of the electrode layers was 75 μm. Each of the electrode layers was formed so as to be line-symmetric with respect to a line connecting center points in the circumferential direction of each the electrode layers when observed at any cross section perpendicular to the flow path direction of the cells. The electrical resistivities at 25° C. were measured by the four-terminal method using test pieces made of the same materials as those of the honeycomb structure portion and the electrode layers, and found that they were 1.5 Ωcm and 0.007 Ωcm, respectively.

Each of the electrode layers of the honeycomb structure obtained in the above-mentioned procedure had one end at a position of 0% from the first end face and the other end at a position of 41% from the first end face, relative to a length (100%) in the flow path direction of the cells from the first end face to the second end face of the honeycomb structure portion, so that the electrode layer was extended from the one end to the other end in the flow path direction of the cells.

The honeycomb structure obtained in the above-mentioned procedure was divided into four equal portions in the flow path direction of the cells to form four regions of A, B, C, and D from the side closer to the first end face. In each of the above-described four regions, an average value ($R_A$, $R_B$, $R_D$, and $R_D$) of electric resistances measured between two points determined so that a distance between the pair of electrode layers was the longest in the cross section perpendicular to the flow path direction of the cells (when there was no pair of electrode layers in such a cross section, the two points were determined so that a distance between the two points was the longest in the cross section) was obtained. The average value of the electric resistances in each of the four regions was regarded as an average value when the electric resistances were measured at five equally spaced positions including both ends in the flow path direction of the cells. The result showed that $R_A:R_B:R_C:R_D=1:1.6:2:2$.

The electrode layer of the honeycomb structure obtained in the above-mentioned procedure was divided into four equal portions in the flow path direction of the cells to form four regions of A, B, C, and D from the side closer to the first end face. In each of the above-described four regions, an average value ($D_A$, $D_B$, $D_C$, and $D_D$) of distances between two points determined so that a distance between the pair of electrode layers was the shortest in the cross section perpendicular to the flow path direction of the cells was geometrically measured. The result showed that $D_A:D_B:D_C:D_D=1:1.15:1.38:1.50$.

The electrode layer of the honeycomb structure obtained in the above-mentioned procedure was divided into four equal portions in the flow path direction of the cells to form four regions of A, B, C, and D from the side closer to the first end face. In each of the above-described four regions, an average value of electric resistivities of the material constituting each of the electrode layers was represented as $r_A$, $r_B$, $r_C$, and $r_D$ in this order from the side closer to the first end face. In the present example, the same electrode layer forming paste was used in each of the four regions, and therefore a relational expression of $r_A=r_B=r_C=r_D$ was satisfied.

The terminal connecting portions and the electrode layers were removed by cutting from the honeycomb structure obtained in the above-mentioned procedure and then the honeycomb structure was divided into four equal regions in the flow path direction of the cell. As to the four equally spaced regions, the electric resistances in the above-mentioned nine directions of (1) to (9) were measured, and an average value of the electric resistances of the four regions in each of the nine directions was obtained. The result showed that each of the electric resistances in the above-mentioned nine directions in each region fell within a range of ±10% relative to the average value of the electric resistances in the corresponding direction.

(7. Measurement of Temperature Distribution in Simultaneous Energization Test)

A pair of cables were connected to the pair of terminal connecting portions of the honeycomb structure obtained in the above-mentioned procedure with clips, 2 kW was applied to the pair of cables, and air flow at room temperature was started to be applied to the honeycomb structure at a flow rate of 1 Nm$^3$/min. At this time, the temperature change of the central axis of the honeycomb structure was monitored by measuring the temperature using a thermocouple at the positions of 10 mm, 38 mm, 76 mm and 104 mm away from the first end face (inlet side) in the flow path direction of the cell. The result is shown in FIG. 6(A). In FIG. 6(A), the black solid line, the gray solid line, the black dotted line, and the gray dotted line represent the temperature measurement values at the positions of 10 mm, 38 mm, 76 mm and 104 mm away from the first end face, respectively.

Comparative Example 1, Examples 2 to 7

The fired honeycomb structure portion provided with the terminal connecting portions was prepared in the same procedure as in Example 1. A honeycomb structure was produced by the same procedure as in Example 1, with exception that the electrode layer conditions were changed to those shown in Table 1 according to the test numbers. In Table 1, the expression "design type" shows which of electrode layer designs of (A) to (E) illustrated in FIG. 4 the test number corresponds to. In Table 1, the expressions "position of one end in flow path direction of cell" and "position of the other end in flow path direction of cell" indicate the relative positions of one end and the other end of the electrode layer from the first end face, relative to the full length (100%) of the flow path of the cell. The expression "position of the terminal connecting portion" also indicates the relative position (%) from the same end face.

The energization test was carried out in the same conditions as in Example 1 with respect to the resulting honeycomb structure for each test example, and the temperature change of the central axis of the honeycomb structure was monitored at the positions of 10 mm, 38 mm, 76 mm and 104 mm away from the inlet side in the same manner as in Example 1. As to Examples 2 to 7 and Comparative Example 1 including Example 1, differences between a maximum temperature and a minimum temperature measured at the four temperature measurement positions one minute after energization start are ranked as A, B, C, and D in the ascending order, and the ranked results are shown in Table 1. For reference, the results of Comparative Example 1 are shown in FIG. 6(B). In FIG. 6(B), the black solid line, the gray solid line, the black dotted line, and the gray dotted line represent the temperature measurement values at the positions of 10 mm, 38 mm, 76 mm and 104 mm, respectively.

wherein a pair of electrode layers extending in a flow path direction of the cells constitutes a part of an outer surface of the outer peripheral side wall, one electrode layer of the pair of electrode layers is disposed on a side opposite to the other electrode layer across a central axis of the honeycomb structure portion, and when the honeycomb structure is divided into four equal portions in the flow path direction of the cells to form four regions of A, B, C, and D from a side closer to the first end face, and an average value of electric resistances measured between two points in each of the four regions is represented as $R_A$, $R_B$, $R_C$, and $R_D$ in this order from the side closer to the first end face, a relational expression of $R_A \leq R_B \leq R_C \leq R_D$ (excluding $R_A = R_B = R_C = R_D$) is satisfied provided that the two points being determined so that a distance between the pair of electrode layers is the longest in the cross section perpendicular to the flow path direction of the cells, however, when there is no pair of electrode layers in such a cross section, the two points being determined so that a distance between the two points is the longest in the cross section.

TABLE 1

| Test number | Design type | Electrode layer condition $R_A:R_B:R_C:R_D$ | $D_A:D_B:D_C:D_D$ | $r_A:r_B:r_C:r_D$ | Position of one end in flow path direction of cell (%) | Position of the other end in flow path direction of cell (%) | Position of terminal connecting portion Position in flow path direction of cell (%) | Result of measurement of temperature distribution (uniformity) |
|---|---|---|---|---|---|---|---|---|
| Example 1 | d | 1:1.6:2:2 | 1:1.15:1.38:1.5 | 1:1:1:1 | 0 | 41 | 25 | A |
| Example 2 | b | 1:1.2:1.4:1.4 | 1:1:1:1 | 1:4:8:10 | 0 | 100 | 50 | C |
| Example 3 | b | 1:1.4:1.6:1.9 | 1:1:1:1 | 1:10:20:50 | 0 | 100 | 50 | B |
| Example 4 | a | 1:1.2:1.4:1.8 | 1:1.21:1.38:1.44 | 1:1:1:1 | 0 | 100 | 50 | C |
| Example 5 | d | 1:1.2:1.6:2.1 | 1:1.21:1.37:1.46 | 1:1:1:1 | 0 | 75 | 50 | B |
| Example 6 | a | 1:1.2:1.4:1.8 | 1:1.21:1.38:1.44 | 1:1:1:1 | 0 | 100 | 25 | C |
| Example 7 | d | 1:1.2:1.6:2.1 | 1:1.21:1.37:1.46 | 1:1:1:1 | 0 | 75 | 25 | B |
| Comparative Example 1 | e | 1:1:1:1 | 1:1:1:1 | 1:1:1:1 | 0 | 100 | 50 | D |

REFERENCE SIGNS LIST

100 Conductive honeycomb structure
101 Honeycomb structure portion
102 Outer periphery side wall
103 Terminal connecting portion
104 First end face
106 Second end face
108 Cell
109 Outer surface
110 Partition wall
112 Electrode layer
116 Protruding portion
118 Slit

What is claimed is:

1. A conductive honeycomb structure, comprising:
a pillar-shaped conductive honeycomb structure portion having:
an outer peripheral side wall; and
partition walls disposed inside the outer peripheral side wall defining a plurality of cells to form flow paths so that fluid can enter the flow paths through a first end face and exit through a second end face;

2. The conductive honeycomb structure according to claim 1, wherein
as to $R_A$, $R_B$, $R_C$, and $R_D$, a relational expression of $R_A < R_B < R_C < R_D$ is satisfied.

3. The conductive honeycomb structure according to claim 1, wherein
when the pair of electrode layers is divided into four equal portions in the flow path direction of the cells to form four regions of A, B, C, and D from the side closer to the first end face, and an average value of distances between two points in each of the four regions is represented as $D_A$, $D_B$, $D_C$, and $D_D$ in this order from the side closer to the first end face, a relational expression of $D_A \leq D_B \leq D_C \leq D_D$ (excluding $D_A = D_B = D_C = D_D$) is satisfied provided that the two points being determined so that a distance between the pair of electrode layers is the shortest in the cross section perpendicular to the flow path direction of the cells.

4. The conductive honeycomb structure according to claim 3, wherein
as to $D_A$, $D_B$, $D_C$, and $D_D$, a relational expression of $D_A < D_B < D_C < D_D$ is satisfied.

5. The conductive honeycomb structure according to claim 1, wherein each of the electrode layers has one end in a region from 0 to 5% from the first end face of the honeycomb structure portion, and the other end in a region from 0 to 75% from the first end face of the honeycomb structure portion relative to a length in the flow path direction of the cells from the first end face to the second end face of the honeycomb structure portion, so that the electrode layer is extended from the one end to the other end in the flow path direction of the cells.

6. The conductive honeycomb structure according to claim 5, wherein
each of the electrode layers has one end in a region from 0 to 5% from the first end face of the honeycomb structure portion, and the other end in a region from 0 to 50% from the first end face of the honeycomb structure portion relative to a length in the flow path direction of the cells from the first end face to the second end face of the honeycomb structure portion, so that the electrode layer is extended from the one end to the other end in the flow path direction of the cells.

7. The conductive honeycomb structure according to claim 1, wherein
the electrode layers are formed so as to be line-symmetric with respect to a line connecting center points in a circumferential direction of the electrode layers when observed at any cross section perpendicular to the flow path direction of the cells.

8. The conductive honeycomb structure according to claim 1, wherein
a mark indicating a fluid flow direction is provided on the honeycomb structure.

9. The conductive honeycomb structure according to claim 1, wherein
when the honeycomb structure from which the electrode layers are removed is divided into four equal portions in the flow path direction of the cells, and the following electric resistances (1) to (9) are measured as to each of the four portions equally divided:
(1) an electric resistance in the flow path direction of the cells between a center of gravity of one end face and the center of gravity of another end face,
(2) an electric resistance in any one direction of in-plane directions of the one end face between a center of gravity of such an end face and an outer peripheral edge of the honeycomb structure portion,
(3) an electric resistance in an in-plane direction of the one end face between the center of gravity of such an end face and the outer peripheral edge of the honeycomb structure portion, the in-plane direction being different by 90° from the direction defined in (2),
(4) an electric resistance in an in-plane direction of the one end face between the center of gravity of such an end face and the outer peripheral edge of the honeycomb structure portion, the in-plane direction being different by 180° from the direction defined in (2),
(5) an electric resistance in an in-plane direction of the one end face between the center of gravity of such an end face and the outer peripheral edge of the honeycomb structure portion, the in-plane direction being different by 270° from the direction defined in (2),
(6) an electric resistance in any one direction of in-plane directions of the other end face between a center of gravity of such an end face and an outer peripheral edge of the honeycomb structure portion,
(7) an electric resistance in an in-plane direction of the other end face between the center of gravity of such an end face and the outer peripheral edge of the honeycomb structure portion, the in-plane direction being different by 90° from the direction defined in (6),
(8) an electric resistance in an in-plane direction of the other end face between the center of gravity of such an end face and the outer peripheral edge of the honeycomb structure portion, the in-plane direction being different by 180° from the direction defined in (6), and
(9) an electric resistance in an in-plane direction of the other end face between the center of gravity of such an end face and the outer peripheral edge of the honeycomb structure portion, the in-plane direction being different by 270° from the direction defined in (6),
to obtain an average value of the electric resistances in each direction of the four portions,
the electric resistance in each of the nine directions of each of the four portions falls within a range of ±10% relative to the average value of the electric resistances in the corresponding direction.

10. The conductive honeycomb structure according to claim 1, wherein
when the pair of electrode layers is divided into four equal portions in the flow path direction of the cells to form four regions of A, B, C, and D from the side closer to the first end face, and an average value of electric resistivities of material constituting the pair of electrode layers in each of the above-described four regions is represented as $r_A$, $r_B$, $r_C$, and $r_D$ in this order from the side closer to the first end face, a relational expression of $r_A \leq r_B \leq r_C \leq r_D$ (excluding $r_A = r_B = r_C = r_D$) is satisfied.

11. The conductive honeycomb structure according to claim 1, wherein
a part of the outer peripheral side wall comprises an electrically insulative slit extending in the flow path direction of the cells, the slit being disposed between the outer peripheral side wall portions where the pair of electrode layers each constitute the outer surface.

* * * * *